United States Patent
Akselrod et al.

(10) Patent No.: US 9,329,276 B2
(45) Date of Patent: May 3, 2016

(54) OPTICAL SYSTEM FOR PORTABLE OSL READER

(71) Applicants: Mark S. Akselrod, Stillwater, OK (US); Vasiliy V. Fomenko, Stillwater, OK (US); James Bartz, Stillwater, OK (US)

(72) Inventors: Mark S. Akselrod, Stillwater, OK (US); Vasiliy V. Fomenko, Stillwater, OK (US); James Bartz, Stillwater, OK (US)

(73) Assignee: Landauer, Inc., Glenwood, IL (US)

( * ) Notice: Subject to any disclaimer, the term of this patent is extended or adjusted under 35 U.S.C. 154(b) by 65 days.

(21) Appl. No.: 13/921,345

(22) Filed: Jun. 19, 2013

(65) Prior Publication Data

US 2013/0341515 A1 Dec. 26, 2013

Related U.S. Application Data

(60) Provisional application No. 61/663,223, filed on Jun. 22, 2012, provisional application No. 61/663,241, filed on Jun. 22, 2012.

(51) Int. Cl.
*G01T 1/10* (2006.01)
*G01T 1/105* (2006.01)

(52) U.S. Cl.
CPC .. *G01T 1/10* (2013.01); *G01T 1/105* (2013.01)

(58) Field of Classification Search
CPC ............ G01T 1/105; G01T 1/115; G01T 1/10
See application file for complete search history.

(56) References Cited

U.S. PATENT DOCUMENTS

| 5,114,661 | A | * | 5/1992 | Prelas | ................... H01S 3/0957 |
| | | | | | 372/70 |
| 5,132,543 | A | | 7/1992 | Valentine et al. | |
| 5,731,590 | A | | 3/1998 | Miller | |
| 5,962,857 | A | * | 10/1999 | McKeever | .............. G01T 1/105 |
| | | | | | 250/484.5 |
| 5,962,962 | A | * | 10/1999 | Fujita | ..................... H05B 33/04 |
| | | | | | 313/412 |
| 6,127,685 | A | | 10/2000 | Yoder et al. | |
| 6,198,108 | B1 | | 3/2001 | Schweitzer et al. | |
| 6,846,434 | B2 | | 1/2005 | Akselrod | |
| 7,098,470 | B2 | | 8/2006 | Akselrod et al. | |
| 7,141,804 | B1 | * | 11/2006 | Akselrod | ................ G01T 1/105 |
| | | | | | 250/483.1 |
| 7,157,681 | B1 | | 1/2007 | Tetzlaff | |
| 7,420,187 | B1 | | 9/2008 | Klemic et al. | |
| 8,115,182 | B1 | | 2/2012 | Patel | |
| 8,373,142 | B2 | | 2/2013 | Yoder et al. | |
| 2009/0224176 | A1 | | 9/2009 | Patel | |
| 2011/0168919 | A1 | * | 7/2011 | Yoder | ...................... G01T 3/00 |
| | | | | | 250/483.1 |

FOREIGN PATENT DOCUMENTS

| JP | 2007-47132 A | 2/2007 |
| JP | 2007205766 A | 8/2007 |
| KR | 100529181 B1 | 11/2005 |
| WO | 98/12575 A1 | 3/1998 |

(Continued)

OTHER PUBLICATIONS

Bøtter-Jensen, L., et al., "Optically Stimulated Luminescence Dosimetry," Elsevier, 2003.

(Continued)

*Primary Examiner* — David Porta
*Assistant Examiner* — Jeremy S Valentiner
(74) *Attorney, Agent, or Firm* — Alchemy-Partners, PC (57) ABSTRACT

A device comprising an optically stimulated luminescence (OSL) reader having an optical engine with a light source, collection lens, a removably mounted dichroic mirror, and a photodetector.

16 Claims, 4 Drawing Sheets

(56) References Cited

FOREIGN PATENT DOCUMENTS

| WO | 2011/086495 A2 | 7/2011 |
|---|---|---|
| WO | 2011086492 A2 | 7/2011 |
| WO | 2011/125053 A2 | 10/2011 |
| WO | 2011125053 A2 | 10/2011 |
| WO | 2012036570 A1 | 3/2012 |

OTHER PUBLICATIONS

Klemic, G., et al., "External Dosimetry in the Aftermath of a Radiological Terrorist Event," Radiation Protection Dosimetry, vol. 120, No. 1-4, pp. 242-249, 2006.
Akselrod, M.S., et al., "Preparation and Properties of Al2O3:C," Radiation Protection Dosimetry, vol. 47, No. 1-4, pp. 159-164, 1993.
Akselrod, M.S., et al., "Optically Stimulated Luminescence of Al2O3," Radiation Measurements, vol. 29, No. 3-4, pp. 391-399, 1998.
International Search Report and Written Opinion mailed Feb. 14, 2014 in corresponding International Application No. PCT/IB2013/055120.
International Search Report and Written Opinion mailed Feb. 18, 2014 in corresponding International Application No. PCT/IB2013/055115.
Notification Concerning Transmittal of International Preliminary Report on Patentability (Chapter I of the Patent Cooperation Treaty) received in corresponding PCT Application No. PCT/IB2013/055115 mailed Dec. 31, 2014.
Non-Final Office Action received in related U.S. Appl. No. 13/923,489 mailed Feb. 26, 2015.
Combined Search and Examination Report received in GB Application No. GB 1502108.0, dated Mar. 2, 2015.
Examination Report received in GB Application No. GB 1419686.9, dated Mar. 2, 2015.
Ankjaergaard et al., "Optimising the separation of quartz and feldspar optically stimulated luminescence using pulsed excitation", Radiation Measurements, vol. 45, pp. 778-785 (2010).
Bulur et al., "Frequency modulated pulsed stimulation in optically stimulated luminescence", Nuclear Instruments and Methods in Physics Research B, vol. 179; pp. 151-159 (2001).
Denis et al., "Influence of shallow traps on time-resolved optically stimulated luminescence measurements of Al2O3:C, Mg", Journal of Applied Physics 109; pp. 104906-3 to 104906-10 (2011).
Galloway et al., "Towards the use of green light emitting diodes for the optically stimulated luminescence dating of quartz and feldspar", Meas. Sci. Technol. 3; pp. 330-335 (1992).
Gasparian et al., "Evaluating the influence of experimental conditions on the photon energy response of Al2O3:C optically stimulated luminescence detectors", Radiation Measurements 47; pp. 243-249 (2012).
Product specification for Riso TL/OSL Reader, DTU Nutech Center for Nuclear Technologies, Aug. 18, 2014.
Thomsen et al., "Developments in luminescence measurement techniques", Radiation Measurements 41; pp. 768-773 (2006).
Thomsen et al., "Recent instrumental developments for trapped electron dosimetry", Radiation Measurements 43; pp. 414-421 (2008).
Yukihara et al., "Application of the optically stimulated luminescence (OSL) technique in space dosimetry", Radiation Measurements 41; pp. 1126-1135 (2006).
Office Action received in Canadian Application No. 2,874,240 to Landauer, Inc. mailed Mar. 6, 2015.
Examination Report received in Great Britain Application No. 1419686.9, dated Jun. 30, 2015.
Examination Report received in Great Britain Application No. 1502108.2, dated Jun. 30, 2015.
Extended European Search Report received in European Application No. 13807146.9, dated Jul. 13, 2015.
Akselrod et al., "A Radiation Dosimetry Method Using Pulsed Optically Stimulated Luminescence", Radiation Protection Dosimetry, vol. 81, No. 3, pp. 167-176 (1999).
Guide to "The Riso Pulsed OSL attachment", XP-002741177, Riso, DTU, Denmark, Jun. 2010.
Yukihara et al., "Application of the optically stimulated luminescence (OSL) technique in space dosimetry", Radiation Measurements, 41, pp. 1126-1135 (2006).
Office Action received in Japanese Patent Application No. 2015-517917 dated Jun. 9, 2015.
Communication received in European Application No. 15154231.3 mailed Sep. 4, 2015.
J.L. Genicot et al., "Description of a portable devices devloped at SCK.GEN for OSA and TL dosimetry", Radiation Measurements, vol. 46, pp. 1578-1581 (2011).
Kulkarni et al., "A versatile integrated system for thermoluminescence and optically stimulated luminescence measurements", Nuclear Instruments and Methods in Physics Research Section B: Beam Interactions with Materials and Atoms, vol. 262, Issue 2, pp. 348-356 (Sep. 2007).

* cited by examiner

OPTICAL SYSTEM FOR PORTABLE OSL READER

CROSS-REFERENCE TO RELATED APPLICATIONS

This application claims benefit of priority to U.S. Provisional Patent Application No. 61/663,223 to Akselrod et al., entitled "NOVEL OPTICAL SYSTEM FOR PORTABLE OSL READER, filed Jun. 22, 2012, and U.S. Provisional Patent Application No. 61/663,241 to Dillin et al., filed Jun. 22, 2012, entitled "METHOD AND APPARATUS FOR FAST DETERMINATION OF UNKNOWN RADIATION DOSE," the entire contents and disclosures of which are incorporated herein by reference.

BACKGROUND

1. Field of the Invention

The present invention relates to an optical system for an optically stimulated luminescence (OSL) reader.

2. Related Art

It is a challenge to make an OSL reader that is both compact and easy to maintain.

SUMMARY

According to a first broad aspect, the present invention provides a device comprising: an optically stimulated luminescence (OSL) reader for reading an OSL sensor aligned with a collection lens of the OSL reader at a reading position, the OSL reader comprising: a light source for emitting a stimulation light, the collection lens for optical stimulation of the OSL sensor and for collecting luminescent light emitted by the OSL sensor in response to the stimulation light, a dichroic mirror, and a photodetector, wherein the stimulation light travels along a first light path from the light source to the reading position, wherein the luminescent light travels along a second light path from the reading position to the photodetector, wherein the collection lens is located on the first light path between the light source and the reading position, wherein the dichroic mirror is positioned so that the stimulation light passes therethrough and so that the luminescence light emitted by the OSL sensor is reflected by the dichroic mirror towards the photodetector along the second light path, wherein the collection lens is located on the second light path between the reading position for the OSL reader and the dichroic mirror, wherein the dichroic mirror is located on the first light path between the light source and the collection lens, wherein the light source, dichroic mirror, collection lens and photodetector are each mounted in and/or on an optical engine frame of the OSL reader, and wherein the dichroic mirror is mounted in a first passageway of the engine frame so that opposite edges of the dichroic mirror engage respective grooves of the engine frame.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain the features of the invention.

DETAILED DESCRIPTION OF THE PREFERRED EMBODIMENTS

Definitions

Where the definition of terms departs from the commonly used meaning of the term, applicant intends to utilize the definitions provided below, unless specifically indicated.

For purposes of the present invention, directional terms such as "top", "bottom", "upper", "lower", "above", "below", "left", "right", "horizontal", "vertical", "upward", "downward", etc., are merely used for convenience in describing the various embodiments of the present invention.

For purposes of the present invention, a value or property is "based" on a particular value, property, the satisfaction of a condition, or other factor, if that value is derived by performing a mathematical calculation or logical decision using that value, property or other factor.

For purposes of the present invention, the term "$Al_2O_3$ material" refers to a material that is mainly comprised of $Al_2O_3$. An example of an $Al_2O_3$ material is $Al_2O_3$:C ($Al_2O_3$ doped with carbon).

For purposes of the present invention, the term "computer" refers to any type of computer or other device that implements software including an individual computer such as a personal computer, laptop computer, tablet computer, mainframe computer, mini-computer, microprocessor, field-programmable gate array (FPGA), etc. A computer also refers to electronic devices such as a smartphone, an eBook reader, a cell phone, a television, a handheld electronic game console, a videogame console, a compressed audio or video player such as an MP3 player, a Blu-ray player, a DVD player, etc. In addition, the term "computer" refers to any type of network of computers, such as a network of computers in a business, a computer bank, the Cloud, the Internet, etc.

For purposes of the present invention, the term "distal" refers to a direction away from the center of an optical engine.

For purposes of the present invention, the term "dynamic range of dose measurements" refers to several orders of magnitude of dose measurements dynamically adjustable by the reader software and hardware.

For purposes of the present invention, the term "hardware and/or software" refers to a device that may be implemented by digital software, digital hardware, or a combination of both digital hardware and digital software.

For purposes of the present invention, the term "high speed" refers to radiation dose measurements for an OSL sensor being obtained by an OSL reader in less than one second.

For purposes of the present invention, the term "ionizing radiation" refers to any particulate or electromagnetic radiation that is capable of dissociating molecules into a positively and negatively charged ion pair, or removing electron from an atom contained in gas, liquid or solid matter. In one embodiment, an OSL reader of the present invention may be used to determine doses of ionizing radiation.

For purposes of the present invention, the term "irradiation" refers to the conventional meaning of the term "irradiation", i.e., exposure to high energy charge particles, e.g., electrons, protons, alpha particles, etc., or electromagnetic radiation of wave-lengths shorter than those of visible light, e.g., gamma rays, x-rays, ultraviolet, etc., or neutrons.

For purposes of the present invention, the term "light path" refers to the path that light travels or will travel when light is emitted or transmitted. For example, a particular set and arrangement of lenses, mirrors, filters, etc. may cause stimulation light to travel along a particular light path from an LED light source to an OSL sensor in a reading position when the LED light source is turned on. Also, a particular set and arrangement of lenses, mirror, filters, etc. may cause luminescent light emitted by an OSL sensor to travel along a particular light path from the OSL sensor to a photodetector when the OSL sensor is exposed to stimulation light that causes the OSL sensor to emit the luminescent light.

For purposes of the present invention, term the "microprocessor" refers to a computer processor contained on an integrated circuit chip, such a processor may also include memory and associated circuits. A microprocessor may further comprise programmed instructions to execute or control selected functions, computational methods, switching, etc. Microprocessors and associated devices are commercially available from a number of sources, including, but not limited to, Cypress Semiconductor Corporation, IBM Corporation, Applied Microsystems Corporation, Intel Corporation, Microchip Technology, etc.

For purposes of the present invention, the term "on-board" refers to a device or component that is physically part of an OSL reader.

For purposes of the present invention, the term "on state" refers to a device, such as an LED source being turned on.

For purposes of the present invention, the term "off state" refers to a device, such as an LED source being turned off.

For purposes of the present invention, the term "optical system" and the term "optical engine" are use synonymously to refer to the optical components and related components, such as a light source, photodetector, photodiode, etc. of an OSL reader.

For purposes of the present invention, the term "OSLM" refers to an OSL material, i.e., a material whose exposure to radiation (directly, indirectly or low-penetrating) may be determined using optically stimulated luminescence techniques. An $Al_2O_3$ material, such as an $Al_2O_3$:C, is an example of an OSLM. The amount of radiation exposure that an $Al_2O_3$ material has received may be measured by stimulating the $Al_2O_3$ material with green light from either a laser or light emitting diode source. The resulting blue light emitted from the $Al_2O_3$ is proportional to the amount of radiation exposure and the intensity of stimulation light. Both high and low-energy photons and beta particles can be measured with this technique. For more information on OSL materials and systems, see, U.S. Pat. No. 5,731,590 issued to Miller; U.S. Pat. No. 6,846,434 issued to Akselrod; U.S. Pat. No. 6,198,108 issued to Schweitzer et al.; U.S. Pat. No. 6,127,685 issued to Yoder et al.; U.S. Pat. No. 7,098,470 issued to Akselrod et al.; all of which are incorporated herein by reference in their entireties. See also Optically Stimulated Luminescence Dosimetry, Lars Botter-Jensen et al., Elesevier (2003); Klemic, G., Bailey, P., Miller, K., Monetti, M. External radiation dosimetry in the aftermath of radiological terrorist event, Rad. Prot. Dosim., 120 (1-4): 242-249 (2006); Akselrod, M. S., Kortov, V. S., and Gorelova, E. A., Preparation and properties of $Al_2O_3$:C, Radiat. Prot. Dosim. 47, 159-164 (1993); and Akselrod, M. S., Lucas, A. C., Polf, J. C., McKeever, S. W. S. Optically stimulated luminescence of $Al_2O_3$:C, Radiation Measurements, 29, (3-4), 391-399 (1998), all of which are incorporated herein by reference in their entireties.

For purposes of the present invention, the term "OSL reader" refers to a device that produces stimulation light that stimulates an OSLM in an OSL sensor to emit luminescent light. Under a specified stimulation regime (continuous stimulation, reading wavelength and intensity, and pulsed stimulation with various pulse durations, pulse frequency, pulse shape and time between pulses) the intensity of the emitted light is proportional to the radiation exposure in a range from about 0.01 mGy (1 mrad) to over about 100 Gy (10,000 rads).

For purposes of the present invention, the term "OSL sensor" refers to a radiation sensor that is made from or includes an OSLM. OSL sensors may be read using an OSL reader. One or more OSL sensors may be part of a radiation dosimeter and/or a dosimeter sled. Examples of radiation dosimeters and dosimeter sleds including OSL sensors are described and shown in U.S. Pat. No. 8,373,142 to Yoder et al., entitled, "DOSIMETER SLED," issued Feb. 12, 2013, the entire contents and disclosure of which are incorporated herein by reference.

For purposes of the present invention, the term "portion" refers to any portion of an object or material, including the entire object and material. For example, a converter that covers a "portion" of a luminescent material may cover part or all of one or more surfaces of the luminescent material.

For purposes of the present invention, the term "processor" refers to a device capable of, for example, executing instructions, implementing logic, calculating and storing values, etc. Exemplary processors may include application specific integrated circuits (ASIC), central processing units, microprocessors, such as, for example, microprocessors commercially available from Intel and AMD, etc.

For purposes of the present invention, the term "proximal" refers to a direction towards the center of an optical engine.

For purposes of the present invention, the term "pulsed optically stimulated luminescence" refers to a technique of reading an OSL sensor by stimulating the OSL material in the OSL sensor using a continuous stream of short (i.e. less than the prompt luminescence lifetime) pulses of light, such as laser light or LED light, measuring the emitted light from the OSL sensor only during the time between LED pulses within the stream, with a certain delay after each stimulation LED pulse. Pulsed, optically simulated luminescent (POSL) techniques may be used in reading OSL sensor having OSL material with a relatively long luminescence decay time (i.e. tens of microseconds to tens of milliseconds). An important element in POSL is the choice of a laser or LED pulse width which is significantly shorter than the decay time of the OSL emission from the OSL material.

For purposes of the present invention, the term "radiation dose" refers to the value of the radiation dose for a particular type of radiation to which an OSL sensor has been exposed.

For purposes of the present invention, the term "radiation dosimetry" refers to the conventional meaning of the term "radiation dosimetry", i.e., the measurement of the amount of absorbed radiation dose received in a material, an object or the body of an individual.

For purposes of the present invention, the term "radiation sensing material" refers to a material used to sense radiation in a radiation sensor. Examples of radiation sensitive materials including optically stimulated luminescent materials for OSL sensors, thermoluminescent materials for thermoluminescent dosimetry (TLD) sensors, etc.

For purposes of the present invention, the term "reading position" refers to an OSL sensor that is in a position relative to the optical engine of the OSL reader that allows the OSL sensor to be read by the OSL reader For purposes of the present invention, the term "removably mounted" refers to mounting a component in or on a device so that may be removed and replaced in the device without damaging the device or the means used to retain the component in or on the device. For example, mounting a component, such as a dichroic mirror, in or on an optical engine frame using gaskets, mounting cushions, screws, and/or channels in which ends of the dichroic mirror slide, etc. allows the dichroic mirror to be removed from the optical engine frame without damaging the optical engine frame or the means used to retained the device in the optical engine frame, i.e., the gaskets, mounting cushions, screws, channels in which ends of the dichroic mirror slide, etc. In contrast, a component that is adhered to a device using an adhesive, solder, etc., is fixed in place by being bolted to the device, nailed to the device, etc. is not removably mounted in the device.

For purposes of the present invention, the term "resilient" refers to a material or component that is able to spring back quickly into shape after being bent stretched, squashed or strained.

For purposes of the present invention, the term "slidably mounted" refers to a component that has been mounted in the device by sliding the component into or on the device. For example, a dichroic mirror that is mounted in an optical engine frame by sliding opposite ends of the dichroic mirror in respective channels of the optical engine frame is an example a component that is slidably mounted in the optical engine frame.

For purposes of the present invention, the term the term "storage medium" refers to any form of storage that may be used to store bits of information. Examples of storage include both volatile and non-volatile memories such as MRRAM, MRRAM, ERAM, flash memory, RFID tags, floppy disks, Zip™ disks, CD-ROM, CD-R, CD-RW, DVD, DVD-R, flash memory, hard disks, optical disks, etc.

For purposes of the present invention, the term "visual display device," the term "visual display apparatus" and the term "visual display" refer to any type of visual display device or apparatus such as a an LCD screen, touchscreen, a CRT monitor, LEDs, a projected display, a printer for printing out an image such as a picture and/or text, etc. A visual display device may be a part of another device such as a computer monitor, television, projector, cell phone, smartphone, laptop computer, tablet computer, handheld music and/or video player, personal data assistant (PDA), handheld game player, head mounted display, a heads-up display (HUD), a global positioning system (GPS) receiver, automotive navigation system, dashboard, watch, etc.

Description

In some current optical systems for OSL readout known in the art uses transmission geometry where the OSL sensor is illuminated from one side of the dosimeter sled and luminescent light is collected from the opposite side of the OSL sensor. In other current OSL reader designs, the illumination and luminescent light collection are not collinear. The illumination of OSL sample (radiation detector) is performed at an angle and the luminescent light collection is performed at another sharp angle that reduces the light collection efficiency and sensitivity of the instrument. Also, many of the current optical systems used in OSL readers are bulky and expensive to manufacture.

In one embodiment, the present invention provides an OSL reader that is compact and easy to operate in the field conditions for use by such personnel as Army personnel, Navy personnel, Air Force personnel, Marine personnel, National Guard personnel, Federal Emergency Management Agency (FEMA) workers, first responders (police, firefighters, paramedics, etc), etc.

In one embodiment, the present invention provides an optical engine that provides improved concentration and direction of LED light on an OSL sensor during reading. The illumination of the OSL sensor and luminescent light collection is performed collinearly in reflection geometry using a dichroic mirror, where both stimulation light and luminescence are transmitted through the same optical window.

In one embodiment, the present invention increases OSL reader sensitivity and efficiency, using reflection geometry for illumination and luminescent light collection, to simplify the design, assembly process and use of the OSL reader as well as allowing the sensor to be external to the optical engine.

In one embodiment, the present invention provides a mounting system for a dichroic mirror of an OSL reader that both maintains the dichroic mirror position even when the OSL reader is dropped or jolted and that allows the dichroic mirror to be easily removed from the OSL reader for cleaning of the dichroic mirror. In the event of damage of the dichroic mirror, the mounting system also allows for easy replacement of the dichroic mirror.

Figure 1:
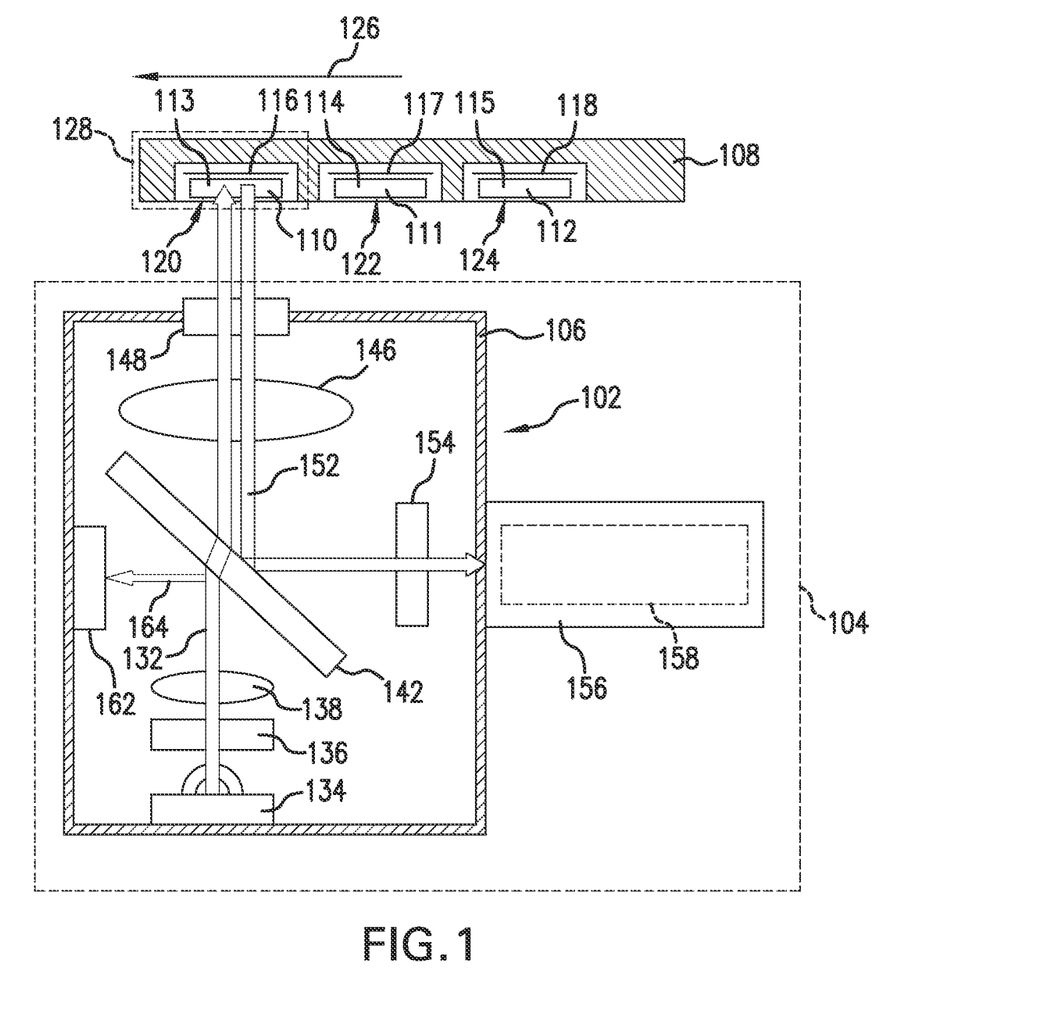
FIG. 1 is a drawing in schematic form of an optical engine of an OSL reader.

FIG. 1 shows an optical engine 102 of an OSL reader 104 according to one embodiment of the present invention. Optical engine 102 includes an optical engine frame 106 on which and in which various components of optical engine 102 are mounted. In FIG. 1, optical engine 102 is shown being used to read a dosimeter sled 108 including three OSL sensors, i.e., OSL sensors 110, 111 and 112. OSL sensors 110, 111 and 112 include respective OSLM discs 113, 114 and 115 and respective reflective backings 116, 117 and 118. OSLM discs 113, 114 and 115 have respective exposed sides 120, 122 and 124. To allow each OSL sensor of dosimeter sled 108 to be read by OSL reader 104, dosimeter sled 108 is moved as shown by arrow 126 to a reading position 128 in OSL reader 104. In FIG. 1, OSL sensor 110 is in a reading position 128, shown as a dashed box. Green stimulation light 132 from an LED 134 is transmitted through a long-wavelength-pass filter 136 and directed on a collimation lens 138. Long-wavelength-pass filter 136 filters out blue tail of green stimulation light 132. In one embodiment, long-wavelength-pass filter 136 is a yellow long-wavelength-pass filter that passes green light and rejects, absorbs and/or blocks blue light. Collimation lens 138 is positioned so that collimation lens 138 collects and collimates green stimulation light 132. After being collimated by collimation lens 138, green stimulation light 132 travels through a dichroic mirror 142. After passing through dichroic mirror 142, green stimulation light 132 is further focused by a collection lens 146 and is directed through a window 148 and towards the OSL sensor that is currently in a reading position 128. In FIG. 1, OSL sensor 110 is in reading position 128. When the OSL sensor at reading position 128 is exposed to green stimulation light 132, blue luminescent light 152 is emitted from the OSL sensor. Blue luminescent light 152 is transmitted through window 148 and collected by collection lens 146. Blue luminescent light 152 is then reflected by dichroic mirror 142 at a 90 degree angle through a blue band-pass filter 154. Blue band-pass filter 154 filters out non-blue light from blue luminescent light 152, i.e., blue band-pass filter 154 is a band-pass blue band-pass filter that passes only blue light and rejects well the green stimulation light. After passing through blue band-pass filter 154, blue luminescent light 152 is detected by photodetector 156 that contains photomultiplier tube (PMT) 158. PMT 158, operating in a photon counting mode, quantifies the luminescence created in the OSL sensor at reading position 128, based on the detected blue luminescent light 152. A photodiode 162 is located directly opposite photodetector 156. A portion 164 of green stimulation light 132 is reflected by dichroic mirror 142 and is detected by photodiode 162, thereby allowing the intensity of green stimulation light 132 to be measured.

Although for simplicity of illustration in FIG. 1 the stimulation light and luminescent light are shown as being in parallel, the stimulation light and luminescent light are actually in alignment and both the stimulation light and luminescent light pass through the center of the window and collection lens of the OSL reader. Also, although the stimulation light is shown only covering a portion of the OSLM disc of the OSL sensor being read, the stimulation light actually illuminates the entire exposed side of the OSLM disc. In addition, although the luminescent light is shown being emitted by portion of the OSLM disc of the OSL sensor being read, the luminescent light actually is actually emitted from the entire exposed side of the OSLM disc.

The dichroic mirror in FIG. 1 is positioned at 45 degrees with respect to both the green stimulation light emitted from the LED and the blue luminescent light emitted from the OSL sensor.

As can be seen in the description above, the dichroic mirror in FIG. 1 is designed to transmit green stimulation light and reflect blue luminescence light.

The output window of the optical engine protects the inside optical components of the optical engine from dust and water condensation that might degrade the performance of the optical engine.

Figure 2:
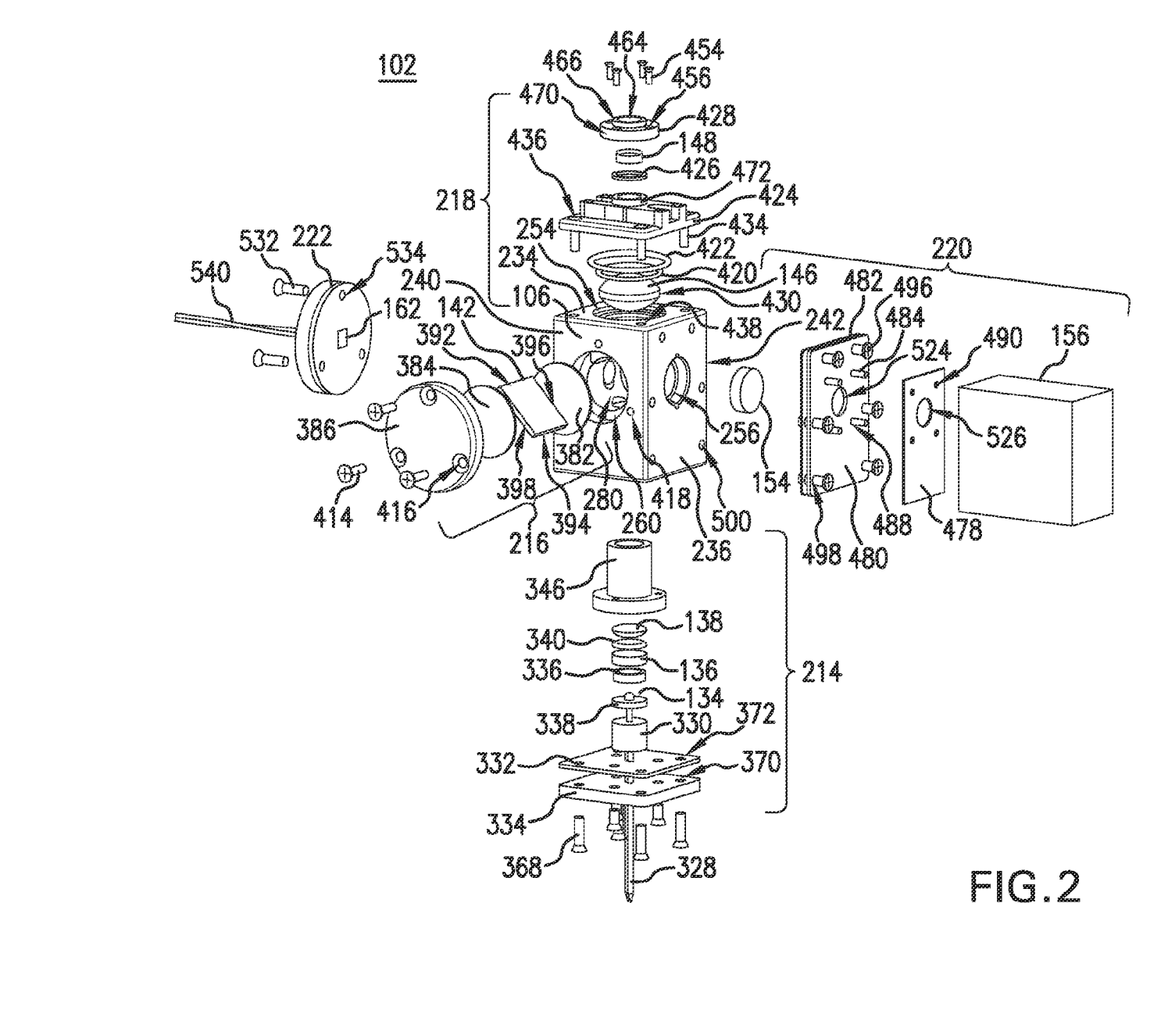
FIG. 2 is an exploded perspective view of the optical engine of FIG. 1.
Figure 3:
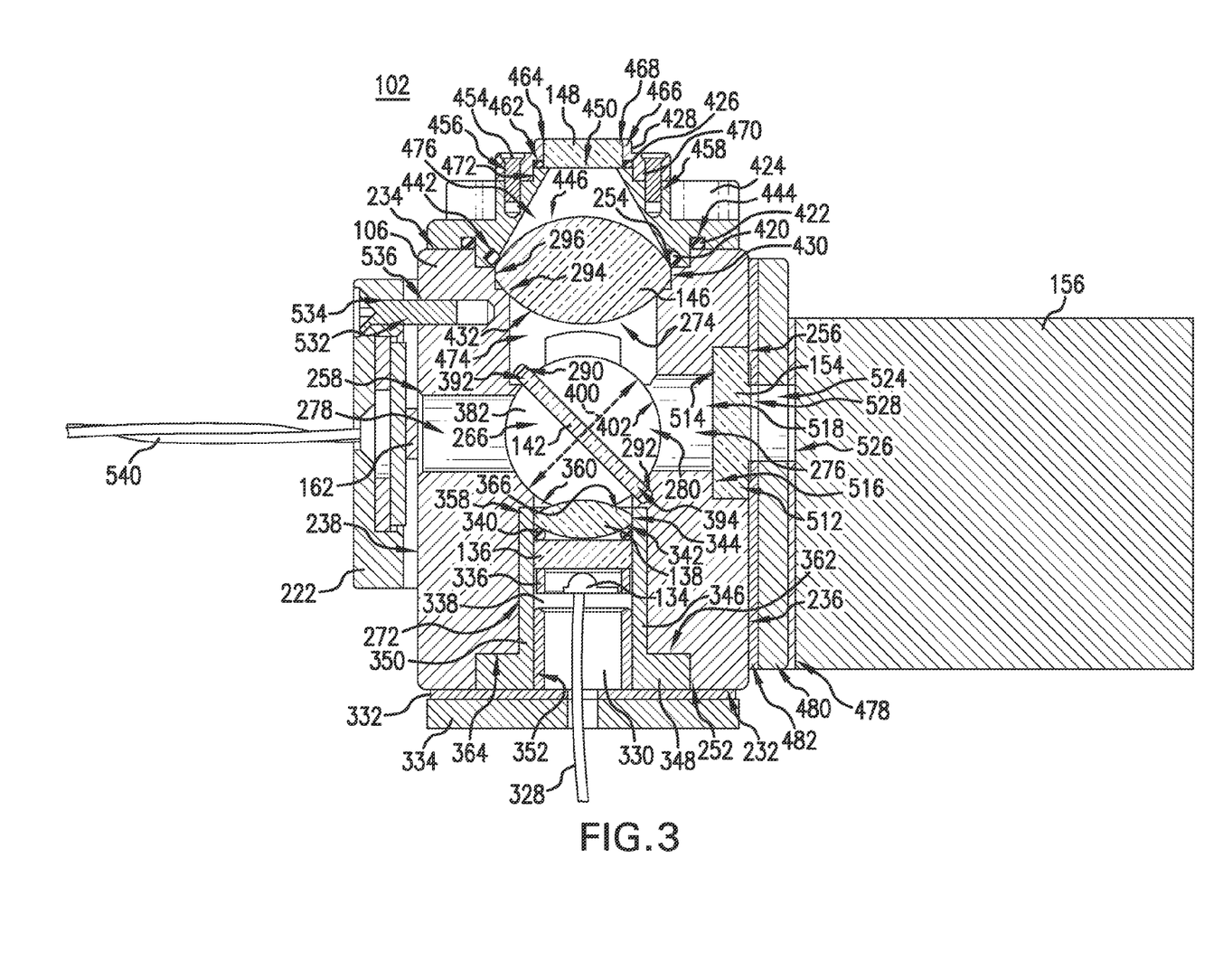
FIG. 3 is a cross-sectional view of the optical engine of FIG. 2 in schematic form.
Figure 4:
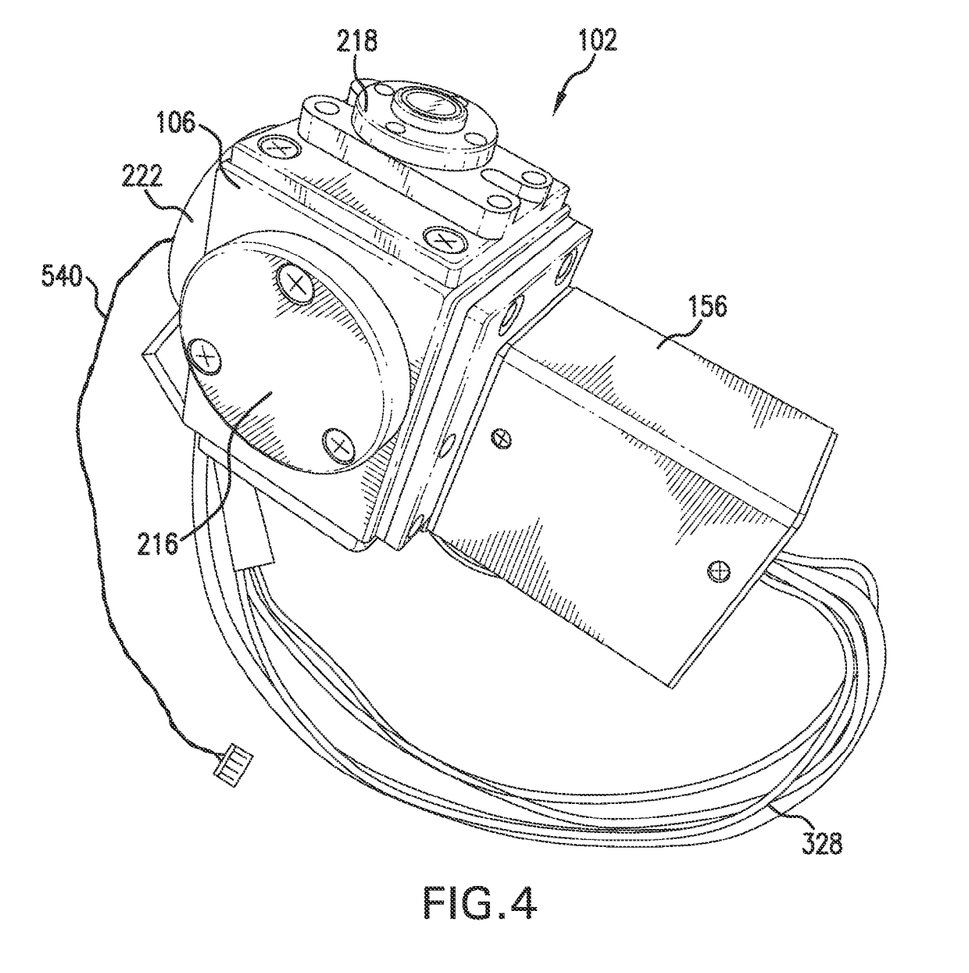
FIG. 4 is an external perspective view of the optical engine of FIG. 2.

FIGS. 2, 3 and 4 show various features of optical engine 102. Optical engine 102 includes an optical engine frame 106, an LED assembly 214, a dichroic mirror assembly 216, a stimulation/collection optical assembly 218, a photodetector assembly 220, and activity sensor 222.

Optical engine frame 106 includes six sides 232, 234, 236, 238, 240 and 242. Side 232 includes an opening 252 through which is inserted LED assembly 214. Side 234 includes an opening 254 for both stimulation and emission light propagation. Side 236 includes an opening 256 for luminescent light detection using photodetector assembly 220. Side 238 includes an opening 258 for measuring the intensity of green stimulation light 132 using photodiode 162. Side 240 includes an opening 260. Side 242 does not include an opening. Optical engine frame 106 has hollow interior cavity 266. A passageway 272 connects opening 252 with hollow interior cavity 266. A passageway 274 connects opening 254 with hollow interior cavity 266. Passageway 276 connects opening 256 with hollow interior cavity 266. A passageway 278 connects opening 258 with hollow interior cavity 266. A passageway 280 includes 260 and hollow interior cavity 266. Dichroic mirror assembly 216 is mounted in passageway 280. Passageway 280 includes grooves 290 and 292. Passageway 280 includes a circular angled surface 294 and cylindrical wall 296.

LED assembly 214 includes LED 134, long-wavelength-pass filter 136 and collimation lens 138. LED 134 is connected to a power source (not shown) by an electrical connection 328 that extends through a tubular spacer 330, a gasket 332 made of resilient material and a cover plate 334. Long-wavelength-pass filter 136 is positioned above LED 134 by means of a hollow ring spacer 336 that abuts printed circuit board (PCB) 338 of LED 134. Collimation lens 138 is held in place on long-wavelength-pass filter 136 by an O-ring 340 that abuts a peripheral portion 342 of collimation lens 138. Collimation lens 138 includes a rim 344. LED assembly 214 includes assembly frame 346 having a disc-shaped base portion 348 and a cylindrical portion 350 and a cylindrical passageway 352 therethrough. Rim 344 of collimation lens 138 abut cylindrical portion 350 of assembly frame 346. Tubular spacer 330, LED 134, hollow ring spacer 336, long-wavelength-pass filter 136, O-ring 340 and collimation lens 138 are mounted in cylindrical passageway 352. Assembly frame 346 fits into passageway 272 of optical engine frame 106. Passageway 272 has a shape that is complementary to the shape of assembly frame 346. LED assembly 214 is mounted in optical engine frame 106 as shown in FIG. 3. A proximal end 358 of cylindrical portion 350 of assembly frame 346 abuts a circular ledge 360 of passageway 272 and a proximal surface 362 of base portion 348 abuts a circular ledge 364 of passageway 272. Ledge 360 also abuts proximal peripheral portion 366 of collimation lens 138. LED assembly 214 is mounted in optical engine frame 106 by means of screws 368 that are screwed through holes 370 and 372 in cover plate 334 and gasket 332, respectively, and into receiving holes (not shown in FIGS. 2 and 3) of side 232 so that cover plate 334 holds gasket 332 against base portion 348 of assembly frame 346 and tubular spacer 330.

Dichroic mirror assembly 216 includes dichroic mirror 142, resilient mounting pads 382 and 384 and mounting cover 386. Dichroic mirror 142 has mounting edges 392 and 394, and sides 396 and 398. Mounting edges 392 and 394 are opposite and parallel to each other. Sides 396 and 398 are opposite and parallel to each other. Dichroic mirror 142 may be mounted in optical engine frame 106 in the following manner. Resilient mounting pad 382 is inserted into passageway 280. Then edges 392 and 394 of dichroic mirror 142 are slid in grooves 290 and 292 until side 396 of dichroic mirror 142 abuts resilient mounting pad 382. The resilient mounting pad 384 is inserted in opening 260 until resilient mounting pad 384 abuts side 398 of dichroic mirror 142. Resilient mounting pads 382 and 384 have approximately the same diameter, shown in FIG. 3 by dashed double-headed arrow 400, as a cylindrical portion 402 of passageway 280. Then mounting cover 386 is screwed onto side 240 of optical engine frame 106 by screwing screws 414 through respective holes 416 in mounting cover 386 and into respective holes 418 in side 240. When mounting cover 386 is mounted on side 240, mounting cover 386 pushes against resilient mounting pad 384 to thereby push against dichroic mirror 142 which in turn presses against resilient mounting pad 382 to thereby hold in place dichroic mirror 142, resilient mounting pad 382 and resilient mounting pad 384 in hollow interior cavity 266.

Stimulation/collection optical assembly 218 includes collection lens 146, O-ring 420, O-ring 422, mounting frame 424, O-ring 426, window 148 and window frame 428. A proximal surface 432 of collection lens 146 abuts circular angled surface 294. Circular rim 430 of collection lens 146 abuts cylindrical wall 296. Mounting frame 424 is mounted on side 234 of optical engine frame 106 and over collection lens 146 by means of screws 434 that are screwed through holes 436 in mounting frame 424 and into holes 438 in side 234. When mounting frame 424 is mounted on side 234, O-ring 420 mounted in a groove 442 of mounting frame 424 and abuts a distal surface 446 of collection lens 146. O-ring 422 is mounted in groove 444 of mounting frame 424 and abuts side 234 of optical engine frame 106. Window 148 is mounted on a circular opening 450 of mounting frame 424 and is held in place on mounting frame 424 by window frame 428 by screws 454 that are screwed through holes 456 in window frame 428 and into threaded holes 458 in mounting frame 424. O-ring 426 is mounted in groove 462 formed by mounting frame 424 and window frame 428. O-ring 426 surrounds and abuts window 148. Window frame 428 has an opening 464. Window frame also includes a retaining portion 466 that abuts a contoured corner 468 of window 148 and holds window 148 in place on mounting frame 424. A proximal portion 470 of window frame 428 fits over a ring-shaped distal portion 472 of mounting frame 424.

In one embodiment of the present invention, the collection lens of the OSL reader is a double-convex lens manufactured from radiation-hard and fluorescence-free silica glass.

Stimulation light from LED 134 travels through collimation lens 138, through dichroic mirror 142, through a cylindrical proximal portion 474 of passageway 274, through collection lens 146, through tapered distal portion 476 of passageway 274, through opening 450 of mounting frame 424 and through window 148 and onto an OSL sensor, such as OSL sensor 110 of FIG. 1, that is being read.

Photodetector assembly 220 includes photodetector 156, light-sealing gasket 478, mounting plate 480, light-sealing gasket 482 and blue band-pass filter 154. Light-sealing gaskets 478 and 482 are each made of a resilient material. Light-sealing gasket 478, mounting plate 480 and light-sealing gasket 482 are mounted on photodetector 156 by screws 484 that are screwed through holes (not shown) in light-sealing gasket 478, holes 488 in mounting plate 480 and holes 490 in light-sealing gasket 478 and into threaded mounting holes (not shown) in photodetector 156. Photodetector 156 is mounted on side 236 of optical engine frame 106 by screws 496 that are screwed through holes 498 in mounting plate 480, holes (not shown) in light-sealing gasket 482 and into threaded holes 500 in side 236. Blue band-pass filter 154 is mounted in a wider portion 512 of passageway 276. A proximal side 514 of blue band-pass filter 154 abuts a ledge 516 where a narrower portion 518 of passageway 276 meets wider portion 512. Blue band-pass filter 154 is held in place by mounting plate 480 and light-sealing gasket 482. Mounting plate 480 includes an opening 524. Light-sealing gasket 478 includes an opening 526. Light-sealing gasket 482 includes an opening 528.

Blue luminescent light emitted by an OSL sensor being read travels through window 148, through opening 450 of mounting frame 424, through tapered distal portion 476 of passageway 274, through collection lens 146, through a cylindrical proximal portion 474 of passageway 274. Blue luminescent light 152 is then reflected by dichroic mirror 142 through passageway 276, through blue band-pass filter 154, through opening 528 in light-sealing gasket 482, through opening 524 in mounting plate 480, through opening 526 in light-sealing gasket 478, and onto photodetector 156 where the emitted blue luminescent light 152 is detected.

In one embodiment of the present invention, the photodetector includes a photomultiplier tube (PMT) that uses a high sensitivity counting system. The amount of blue light emitted from the OSL sensor during optical stimulation by the green stimulation light is directly proportional to the radiation dose and the intensity of the green stimulation light. A dose calculation algorithm is then applied to the measurement to quantify radiation exposure.

Activity sensor 222, which includes photodiode 162, is mounted on side 238 of optical engine frame 106 by screws 532 that are screwed through holes 534 in activity sensor 222 and into threaded holes 536 in side 238 of the optical engine frame 106. Activity sensor 222 includes electrical connection 540 for connecting activity sensor 222 to the main electronic board of the OSL reader.

A portion of the stimulation light from LED 134 is reflected by dichroic mirror 142 through passageway 278 through opening 258 and onto photodiode 162.

In one embodiment, the alignment of mirror, lenses and filters of the optical engine of the present invention are not significantly affected by vibrations when a dosimeter reader including the optical engine is transported or shocked, because all the components of the photo-optical engine are securely fastened on or in the optical engine frame. The mirror, lenses and filters of the photo-optical engine are less subject to misalignments caused by vibrations than the mirrors, lenses and filters of other OSL readers because the small distances between components maximize the solid angles through which the various light rays must pass for correct transmission through the optical pathway. The close arrangement of the components minimizes losses due to light beams diverging and scattering.

Each of the O-rings, gaskets and mounting pads used in the optical engine of the present invention may be made of one or more resilient materials such as rubber, plastic, etc. that is commonly used for O-rings.

Although a particular type of optical filter is described above as being used in the optical system, optical filters separating a variety of different wavelength of light may be used in the optical filter assembly of the present invention depending on the wavelength used as a light source for the stimulation light and the wavelength at which the OSLM of the OSL sensor absorbs and emits light. Also, although a particular type of optical filter is described above as being used as a filter in front of the photodetector detecting emitted light from the OSL sensor, optical filters filtering a variety of different colors may be used with the emitted light detector of the present invention depending on the wavelength at which OSLM emits OSL.

The optical engine frame may be made of any suitable material such as metal, plastic, etc.

For simplicity of illustration, various features of the optical engine are not shown in FIG. 1 including mounting adapter plates, modules, PCB boards and pig-tale wires with connectors for the photodetector, LED, and photodiode, spacers, rubber gaskets, O-rings, and screws, used for precise and secure mounting of all mentioned optical components.

In addition to the components described above and shown in the drawings, an OSL reader according to various embodiments of the present invention may include components such as one or more visual display devices for displaying information such as radiation dosage, input devices for controlling the operation of the OSL reader, one or more microprocessors for controlling the operation of the OSL reader, one or more storage mediums for storing information such as calibration data, measured radiation dosage data, RFID tag readers, etc. Examples of some of the additional components that may be present in an OSL reader of the present invention are described and show in U.S. Pat. No. 8,373,142 to Yoder et al., entitled, "DOSIMETER SLED," issued Feb. 12, 2013, the entire contents and disclosure of which is incorporated herein by reference. The OSL reader may include various electronic components for carrying out various functions such as producing stimulation light, processing signals from the photodetector, etc.

All documents, patents, journal articles and other materials cited in the present application are incorporated herein by reference.

While the present invention has been disclosed with references to certain embodiments, numerous modification, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A device comprising:
an optically stimulated luminescence (OSL) reader for reading an OSL sensor aligned with a collection lens of the OSL reader at a reading position, the OSL reader comprising:
a light source for emitting a stimulation light,
the collection lens for focusing the stimulation light on the OSL sensor to illuminate an entire exposed side of an OSL material disc of the OSL sensor to thereby stimulate optical stimulation of the OSL sensor and for collecting luminescent light emitted by the OSL sensor emitted by the entire exposed side in response to the stimulation light,
a dichroic mirror, and
a photodetector,
wherein the stimulation light travels along a first light path from the light source to the reading position,
wherein the luminescent light travels along a second light path from the reading position to the photodetector,
wherein the collection lens is located on the first light path between the light source and the reading position,
wherein the dichroic mirror is positioned so that the stimulation light passes therethrough and so that the luminescence light emitted by the OSL sensor is reflected by the dichroic mirror towards the photodetector along the second light path,
wherein the collection lens is located on the second light path between the reading position for the OSL reader and the dichroic mirror,
wherein the dichroic mirror is located on the first light path between the light source and the collection lens,
wherein the light source, dichroic mirror, collection lens and photodetector are each mounted in and/or on an optical engine frame of the OSL reader, and
wherein the dichroic mirror is mounted in a first passageway of the engine frame so that opposite edges of the dichroic mirror engage respective grooves of the engine frame.

2. The device of claim 1, wherein the dichroic mirror is removably mounted in the engine frame.

3. The device of claim 1, wherein the device includes a first mounting pad and a second mounting pad located in the first passageway on first and second sides of the dichroic mirror, wherein the first mounting pad and the second mounting pad each comprise a resilient material, wherein the first and second sides of the dichroic mirror are opposite sides of the dichroic mirror, wherein a mounting cover is mounted over an opening of the passageway, wherein the first mounting pad abuts a wall of the first passageway and first side of the dichroic mirror, wherein the second mounting pad abuts the second side of the dichroic mirror and the mounting cover, and wherein the mounting cover holds the dichroic mirror, the first mounting pad and the second mounting pad in place the first passageway.

4. The device of claim 1, wherein the light source comprises a light emitting diode (LED).

5. The device of claim 1, wherein the device comprises a collimation lens for collecting and shaping the stimulation light and wherein the collimation lens is located on the first light path between the light source and the dichroic mirror.

6. The device of claim 1, wherein the OSL reader comprises a long-wavelength-pass filter for excluding non-green light from the stimulation light and wherein the long-wavelength-pass filter is located in the first light path between the light source and the collection lens.

7. The device of claim 6, wherein the long-wavelength-pass filter is a yellow filter and wherein the yellow filter is part of a light source assembly comprising the light source, and wherein the light source assembly is mounted in a recess of the optical engine frame.

8. The device of claim 6, wherein the device comprises a blue band-pass filter for filtering out non-blue light from the emitted luminescence light and for filtering out any stray light or stimulation light, and wherein the blue band-pass filter is located in the second light path between the dichroic mirror and the photodetector.

9. The device of claim 1, wherein the OSL reader comprises an activity sensor for measuring the amount of stimulation light and determining that the OSL reader is functional when a non-zero (non-0) reading is received from the photodetector, and where the activity sensor is illuminated by a portion of the stimulation light being reflected by the dichroic mirror, and wherein the activity sensor comprises a photodiode.

10. The device of claim 1, wherein the stimulation light source transmits stimulation light having a wavelength of about 520 nm and wherein OSL sensor emits luminescence light at a wavelength of about 420 nm in response to the OSL sensor being illuminated with the stimulation light.

11. The device of claim 1, wherein the collection lens is a double-convex lens.

12. The device of claim 11, wherein the collection lens is manufactured from radiation-hard and fluorescence-free silica glass.

13. The device of claim 1, wherein the collection lens focuses the stimulation light.

14. The device of claim 8, wherein the dichroic mirror is positioned at a 45 degree angle to the luminescence light emitted by the OSL sensor.

15. The device of claim 14, wherein the dichroic mirror reflects the luminescence light at a 90 degree angle through the blue band-pass filter.

16. The device of claim 6, wherein the long-wavelength-pass filter is positioned at a 90 degree angle to the stimulation light.

* * * * *